United States Patent [19]

Peruso

[11] Patent Number: 5,278,722

[45] Date of Patent: Jan. 11, 1994

[54] SWITCHGEAR RACKING MECHANISM INCLUDING SELF-RETAINING CRANK AND DRAW-OUT UNIT POSITION INDICATOR

[75] Inventor: Michael L. Peruso, Knightdale, N.C.

[73] Assignee: Siemens Energy & Automation, Inc., Alpharetta, Ga.

[21] Appl. No.: 29,742

[22] Filed: Mar. 11, 1993

[51] Int. Cl.$^5$ ............................................. H02B 11/00
[52] U.S. Cl. ................................ 361/606; 200/50 AA; 361/608
[58] Field of Search .......... 200/50AA; 361/336–340, 342, 390; 391

[56] References Cited

U.S. PATENT DOCUMENTS

| | | | |
|---|---|---|---|
| 2,673,260 | 3/1954 | Lester et al. | 361/336 |
| 4,262,175 | 4/1981 | Rexroad et al. | 361/336 |
| 4,281,227 | 7/1981 | Rexroad et al. | 361/336 |
| 4,754,367 | 5/1988 | Bohnen | 361/339 |
| 4,814,942 | 3/1989 | Robirds et al. | 361/336 |

*Primary Examiner*—Gregory D. Thompson
*Attorney, Agent, or Firm*—Peter A. Luccarelli, Jr.

[57] ABSTRACT

A racking mechanism (30) for switchgear cubicle (20) draw-out units (24) including a base (39); and a drive screw assembly (44) attached to the base (39) including a screw block (36) translated by rotation of the screw. The screw block (36) is adapted for selective coupling to a draw-out unit (24). Drive surfaces (72) are constructed on the drive screw assembly (44). A biased racking shield (52) which surrounds at least a portion of the drive surfaces (72) in a first position is translatable to a second position by exerting counter-biasing force against the racking shield, in order to expose a portion of the drive surfaces (72). A crank assembly (76) having a socket portion (80) is engageable with the drive surfaces (72) when the racking shield (52) is translated to its second position, in order to rotate the drive screw (44). The socket portion (80) is retained in engagement with the drive surfaces (72) upon translation of the racking shield (52) to its second position by detent groove (74) and spring plungers (82). The racking mechanism (30) may include a tape indicator assembly (96) visible while cranking the crank assembly (76).

16 Claims, 12 Drawing Sheets

SWITCHGEAR RACKING MECHANISM INCLUDING SELF-RETAINING CRANK AND DRAW-OUT UNIT POSITION INDICATOR

BACKGROUND OF THE INVENTION

The present invention is directed to switchgear cubicle racking mechanisms; and in particular hand-operated cranking mechanisms which accomplish racking movement of switchgear draw-out units and mechanical displays which indicate position of draw-out units within cubicles.

Rackable switchgear draw-out units, such as draw-out vacuum circuit breakers are commonly used in the electrical distribution and control fields. The draw-out unit is housed within a cubicle and connected to a busway system within the cubicle for transmission of electrical power. The draw-out units can be removed from the cubicle by translation on fixed, non-steerable but rotatively-mounted wheels or rollers, after power to the cabinet is shut down and appropriate safety measures well known in the art are taken to inhibit the likelihood of injury to service personnel.

Translation of the draw-out units within the cubicle is accomplished with a racking mechanism. A known example of a switchgear cubicle with a draw-out unit racking mechanism is sold by the assignee of the present application, Siemens Energy & Automation, Inc., through its Electrical Apparatus Division, located in Raleigh, N.C., U.S.A., under the designation, "Type GM Switchgear".

In the known switchgear, a racking screw mechanism having acme-type threads is affixed to the cubicle on sleeve bearings. Rotation of the screw mechanism translates a drive block having a cammed toggle attached thereto. The toggle urges against a racking block affixed to the draw-out unit, such as a vacuum-type circuit breaker, in order to cause translation of the draw-out unit.

In the known switchgear racking mechanism, the screw mechanism was rotated by way of a crank handle having a female socket portion which engaged a male socket portion constructed on the screw shaft. In order to engage the mating socket drive portions, the previously known switchgear required constant exertion of inwardly directed axial force by the operating technician, because the crank had to be continually biased against a spring loaded racking shield in an axially inwardly direction relative to the screw shaft while turning the crank. The racking shield only partially encircled the screw shaft and spring loading of the shield was accomplished by way of a plurality of offset, tensioned springs.

The existing racking shield of known switchgear is a relatively complex mechanism which does not afford smooth, relatively constant inward tension by the crank operator in order to turn the racking screw.

It is desirable to know the racked position of the switchgear racking unit. Known racking unit position indicators utilize a continuous tape with indicia marking calibrated to correspond to the position of the racking unit. The tape is guided on rollers and a linear tensioning device is utilized to maintain tape tension around the rollers.

Known tape position indicators have been positioned laterally along a side face of the racking unit, so that they have been visible only from close to floor height. An operating technician would have had to bend down to read the indicator and would not have been able to maintain a normal standing position for cranking the unit. Hence, the operator would have had to crank, cease cranking in order read the indicator, and if necessary resume cranking in order to position the racking unit to the desired racked location—for example a test or disconnect position. The operating technician would have had to repeat the guessing process as often as necessary to place the racking unit in the desired position. Also, if the door of the cubicle were open during the racking procedure, the technician would have had to bend down near floor level to read the tape indicator.

It is an object of the present invention to eliminate the need to exert continuous inwardly-directed biasing force against the switchgear racking mechanism crank to enable racking screw turning, so as to translate the switchgear draw-out unit.

It is another object of the present invention to simplify the racking shield and related spring mechanism, so as to provide more uniform inwardly directed axial pressure by a crank operator against the racking screw during engagement of mating socket portions.

It is yet another object of the present invention to reduce manufacturing effort and cost of the racking shield and related spring mechanism of a switchgear racking unit.

Another object of the present invention is to create a racking unit position indicating tape system which allows an operating technician to determine a rackable switchgear draw-out unit position within the cubicle from eye level, in a normal cranking position, so that the technician can determine the position while simultaneously cranking the racking mechanism.

An additional object of the present invention is to enable an operating technician to determine at least one selected position of the draw-out unit while the cubicle door is open.

SUMMARY OF THE INVENTION

The above-recited needs and objects have been achieved by the switchgear racking mechanism including self-retaining crank of the present invention.

One embodiment of the present invention is directed to a racking mechanism for switchgear cubicle draw-out units including a base; and a drive screw assembly attached to the base including a screw block translated by rotation of the screw. The screw block is adapted for selective coupling to a draw-out unit. Drive surfaces are constructed on the drive screw assembly. A biased racking shield which surrounds at least a portion of the drive surfaces in a first position is translatable to a second position by exerting counter-biasing force against the racking shield, in order to expose a portion of the drive surfaces. A crank assembly having a socket portion is engageable with the drive surfaces when the racking shield is translated to its second position, in order to rotate the drive screw. The invention also has means for retaining the socket portion in engagement with the drive surfaces upon translation of the racking shield to its second position.

Another embodiment of the present invention is directed to a racking mechanism for switchgear cubicle draw-out units comprising a switchgear cubicle; a draw-out unit reciprocable within the cubicle; a base attached to the cubicle; and a drive screw assembly attached to the base, including a screw block translated by rotation of the screw. The screw block is adapted for selective coupling to a draw-out unit. Drive surfaces are constructed on the drive screw assembly. The drive mechanism has a biased racking shield which surrounds at least a portion of the drive surfaces in a first position and which is translatable to a second position by exerting counter-biasing force against the racking shield, in order to expose a portion of the drive surfaces. The invention includes a crank assembly having a socket portion engageable with the drive surfaces when the racking shield is translated to its second position, in order to rotate the drive screw. The mechanism includes a means for retaining the socket portion in engagement with the drive surfaces upon translation of the racking shield to its second position.

The present invention is also directed to a racking mechanism for switchgear cubicle draw-out units comprising a switchgear cubicle; a draw-out unit reciprocable within the cubicle; a base attached to the cubicle; and a drive screw assembly attached to the base including a screw block translated by rotation of the screw, which screw block is adapted for selective coupling to a draw-out unit. Drive surfaces are constructed on the drive screw assembly; and a depression is formed in a component of the drive screw assembly. A biased racking shield surrounds at least a portion of the drive surfaces in a first position and is translatable to a second position by exerting counter-biasing force against the racking shield, in order to expose a portion of the drive surfaces. The mechanism includes a crank assembly having a socket portion engageable with the drive surfaces when the racking shield is translated to its second position, in order to rotate the drive screw; and a retaining member translatable into the depression upon translation of the racking shield to its second position, which retaining member prevents separation of the crank assembly socket portion from the drive surfaces.

DESCRIPTION OF THE PREFERRED EMBODIMENTS

Figure 1:
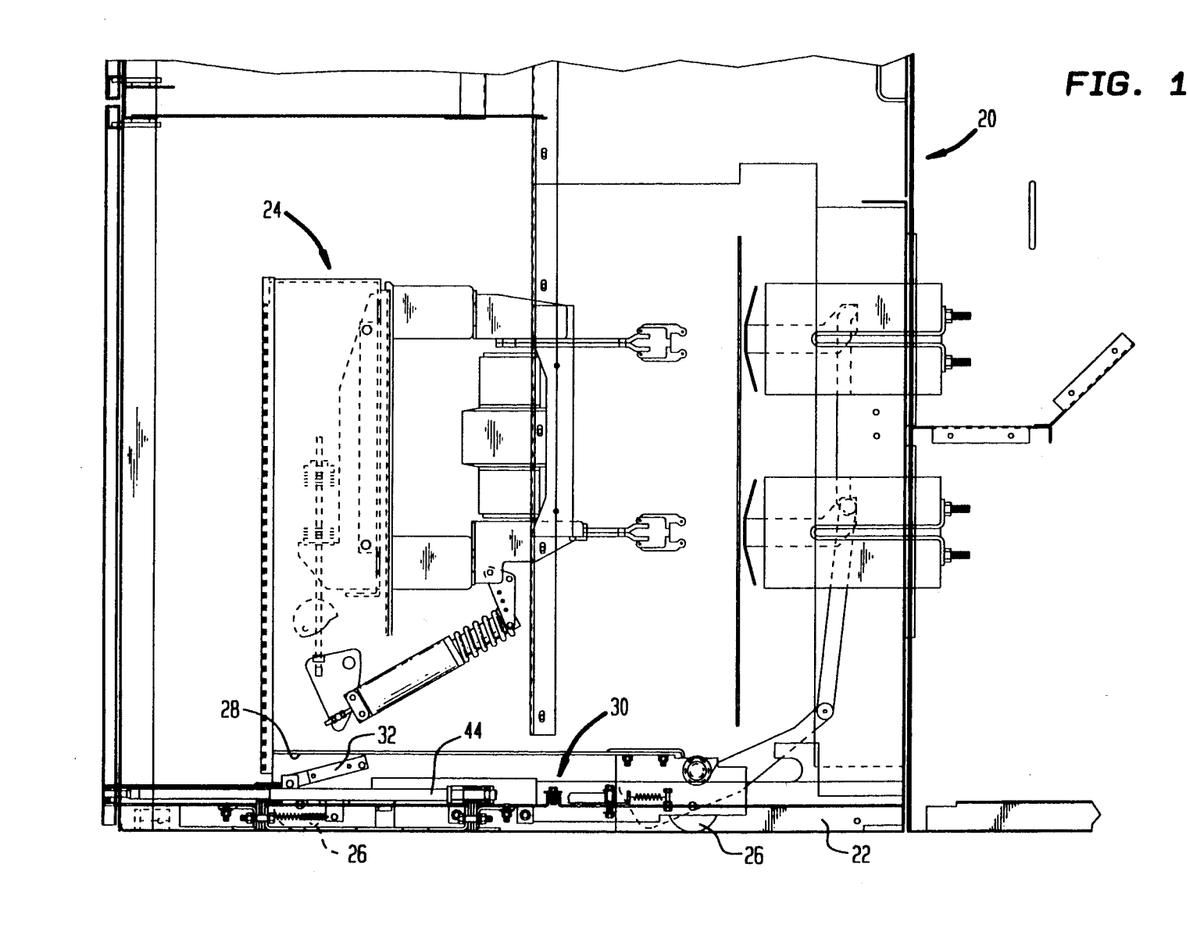
FIG. 1 is a side elevational view of a switchgear cubicle having a draw-out vacuum circuit breaker unit and the racking mechanism of the present invention.
Figure 2:
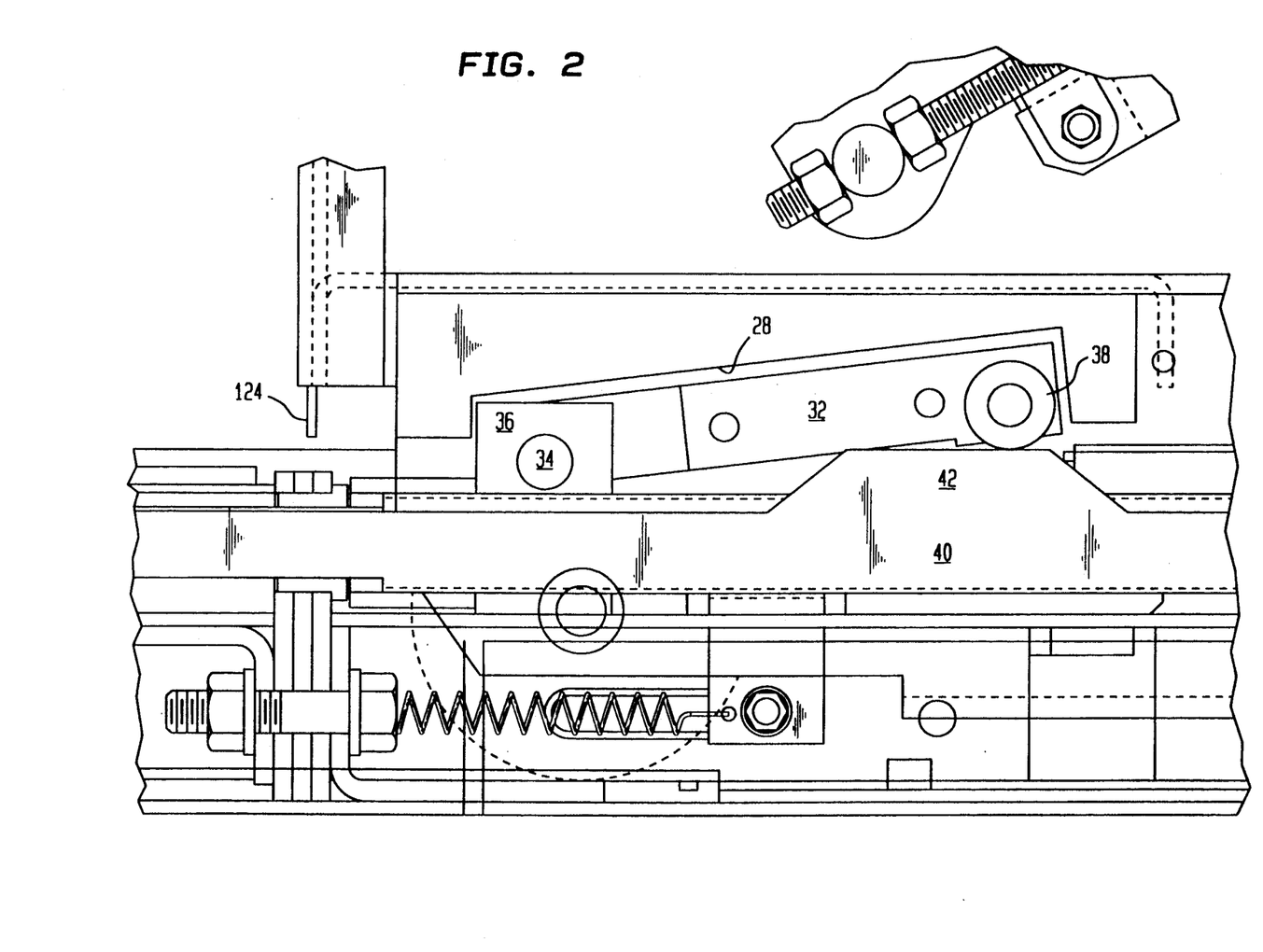
FIG. 2 is a detailed side elevational view of the racking mechanism of FIG. 1.

Referring generally to the figures, FIGS. 1 and 2 show the racking mechanism of the present invention in its intended operating environment within a draw-out unit switchgear cubicle.

Figure 8:
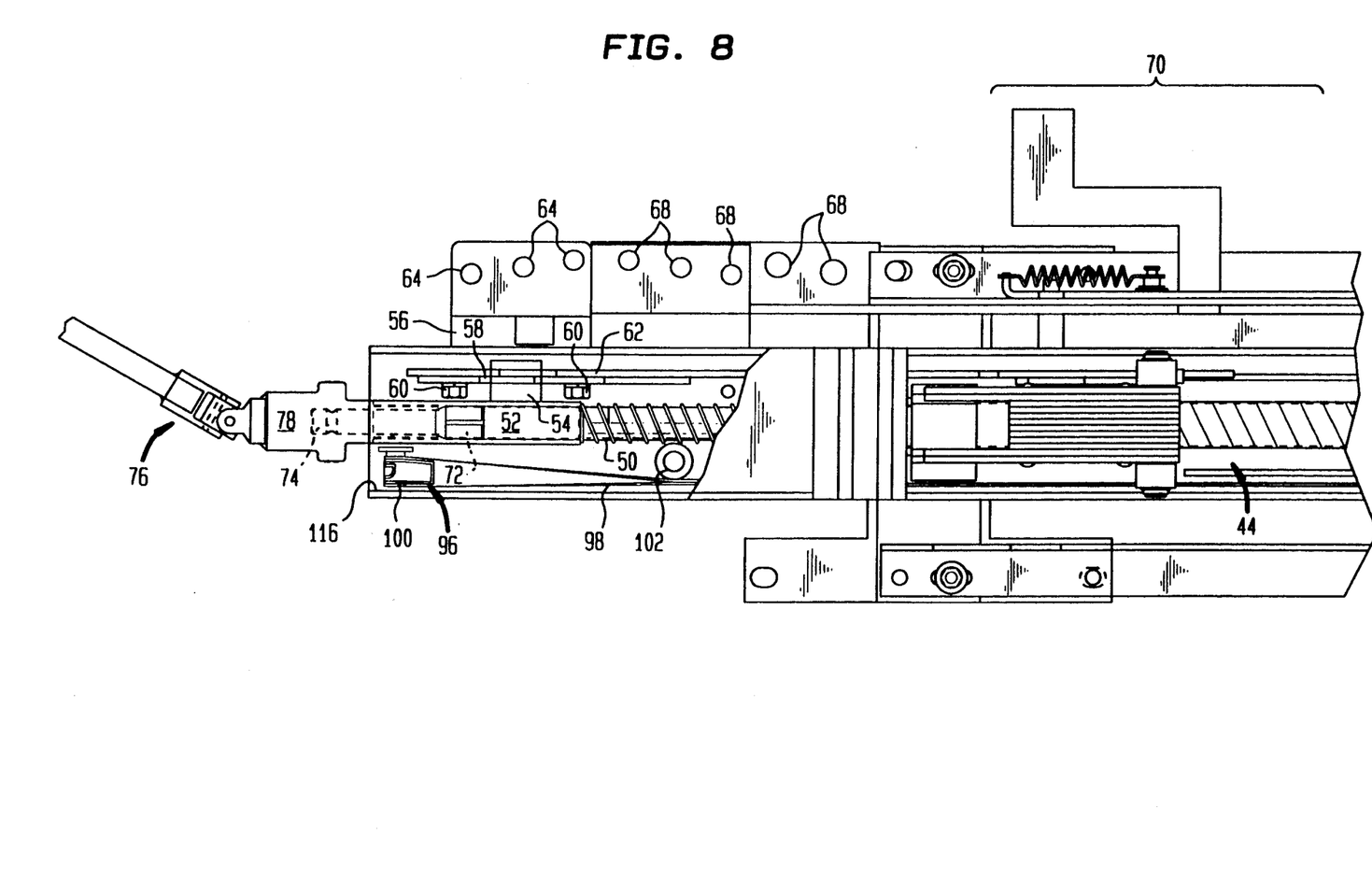
FIG. 8 is a partial detailed plan view of the racking mechanism of FIG. 3 engaged with the socket portion of the racking mechanism crank of the present invention.
Figure 9:
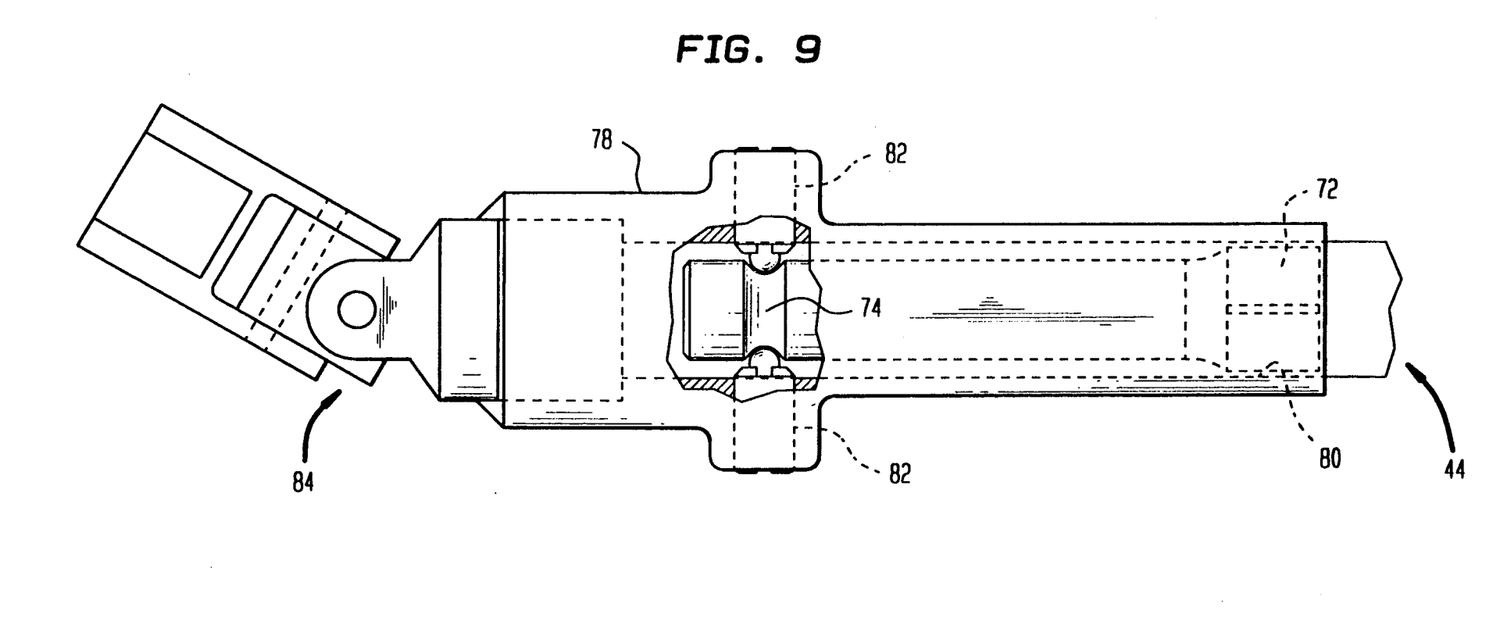
FIG. 9 is a detailed view of the crank socket portion engagement with the drive screw of FIG. 8.
Figure 10:
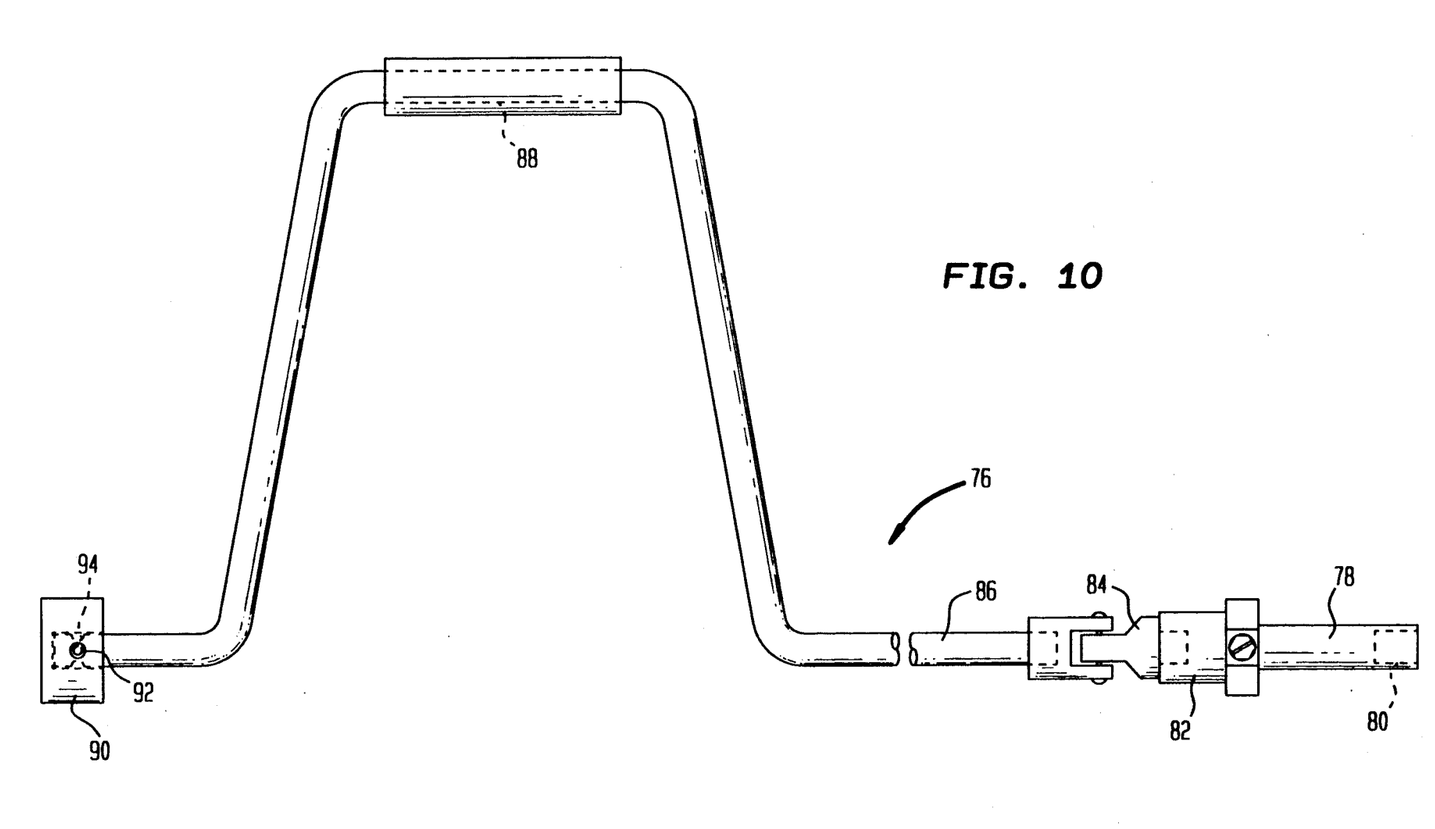
FIG. 10 is a plan view of the racking mechanism crank of the present invention.
Figure 11:
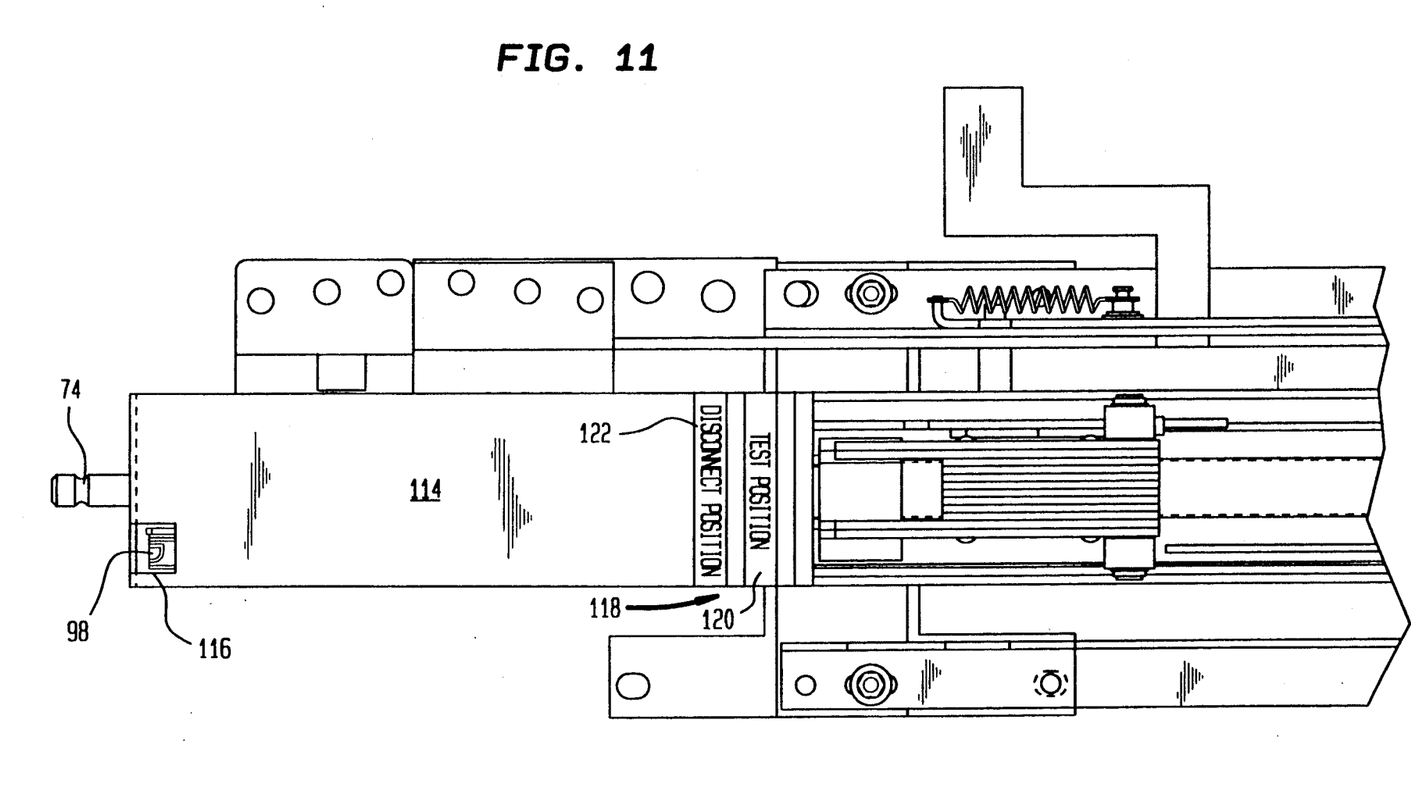
FIG. 11 is a partial detailed plan view of the racking mechanism of the present invention with the draw-out unit position tape indicator showing that the draw-out unit is in the "disconnect" position.
Figure 12:
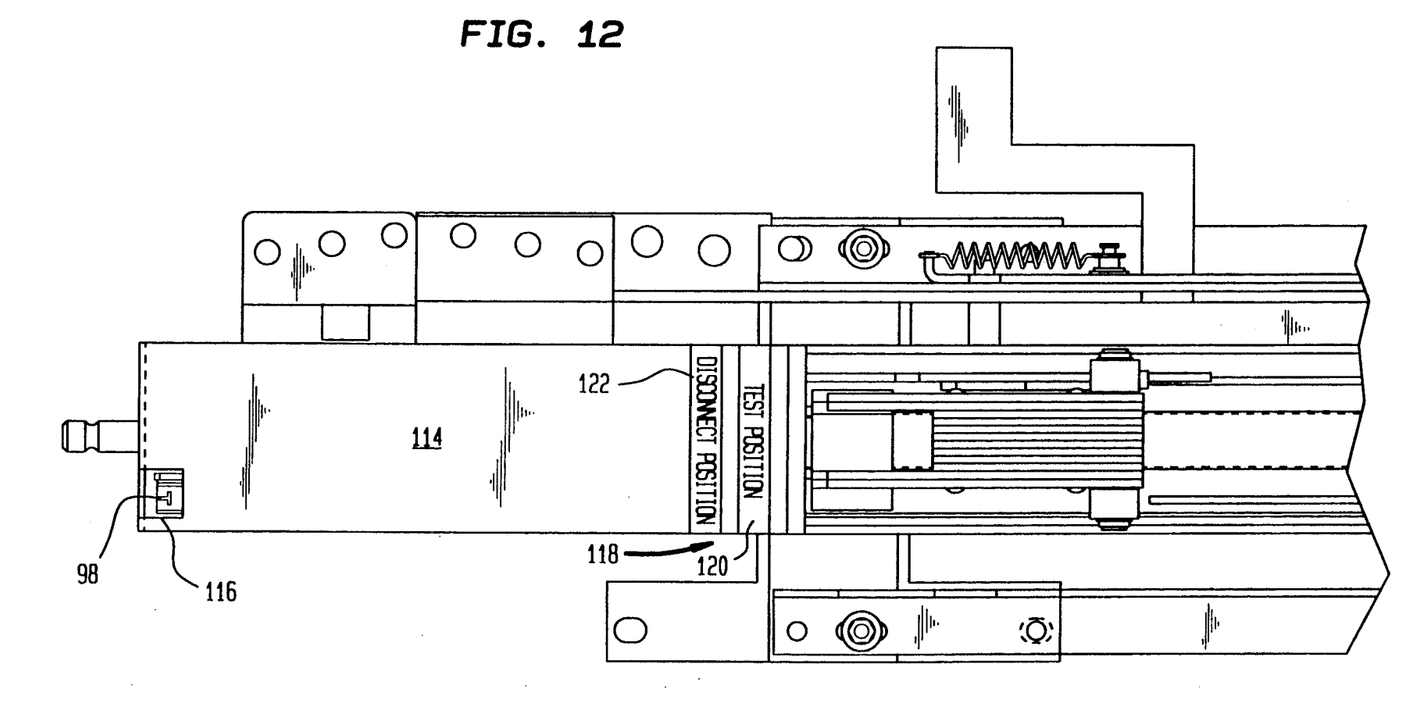
FIG. 12 is a partial plan view as in FIG. 11 with the draw-out unit position tape indicator showing that the draw-out unit is in the "test" position.
Figure 13:
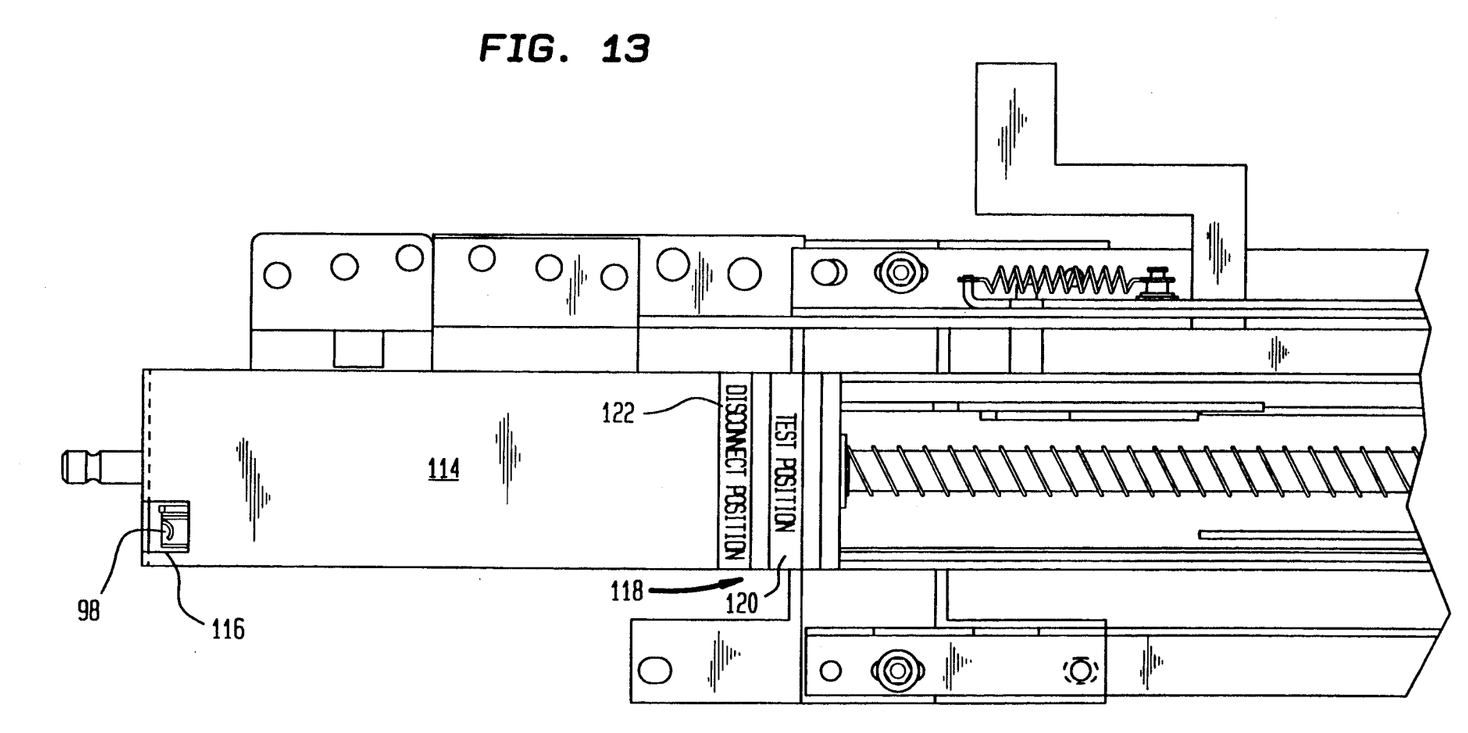
FIG. 13 is a partial plan view as in FIG. 11 with the draw-out unit position tape indicator showing that the draw-out unit is in the "connect" position.

FIGS. 3-7 show the racking mechanism. FIGS. 8-9 show the racking mechanism and racking crank of the present invention in mutual engagement. FIG. 10 shows details of the racking crank construction. FIGS. 11-13 show details of the draw-out unit position tape indicator when the draw-out unit is in three positions within the cubicle. In each figure, like elements are identified with the same identification number.

Referring to FIG. 1, cubicle 20 has roll-out tracks 22 and a draw-out unit, which as shown is a Type GMI draw-out vacuum circuit breaker 24, sold by the Electrical Apparatus Division of Siemens Energy & Automation, Inc. The breaker unit 24 has wheels 26 which are rotatively mounted thereto, in order to allow movement of the breaker 24 from the cubicle 20 in known fashion. The breaker unit 24 also has a racking block 28 which cooperates with the racking mechanism 30 of the present invention in order to translate the breaker in and out of the cubicle 20. While a Siemens Type GMI breaker has been shown and described herein, it should be understood that any known type of draw-out switchgear can be modified to utilize the present invention.

As shown in FIGS. 1-6, the racking mechanism 30 has a racking lever assembly 32 that is toggled into racking block 28. Racking lever assembly 32 is secured by racking lever pivot 34 to drive block 36. As shown, the drive block 36 is an internal thread-type drive block, such as an acme thread-type drive block. The racking lever assembly 32 has a pair of racking rollers 38. Racking mechanism 30 is affixed to cubicle 20 by racking support track 39 or base, which is in turn affixed to rails 40. As may be seen in FIG. 2, rails 40 have rail cams 42 which abut against racking rollers 38 during part of the translation path of racking lever 32, thus providing the toggled, pivoting motion required for racking lever assembly 32 to engage within the racking block 28 of draw-out-type circuit breaker 24.

As shown in FIGS. 3-8, the racking mechanism unit 30 has a racking screw assembly 44 which includes an externally threaded portion, such as one having acme-type threads, to which is mated drive block 36. The screw assembly 44 is connected to the racking mechanism 30 in rotative fashion by forward sleeved bearing assembly 46 (see FIG. 6) and rear sleeved bearing and collar assembly 48 (see FIG. 7). Rotation of screw assembly 44 reciprocates the drive block 36 and in turn reciprocates the drawout breaker unit 24. The construction and generalized operation of the racking screw assembly 44, bearing assemblies 48, 48 and the components cooperating with the racking lever 32 assembly to cause reciprocation of the draw-out unit 24 are of known construction, such as in prior Siemens Energy & Automation, Inc. Type GM Switchgear.

Now, features of the self-retaining crank in the racking mechanism of the present invention will be described in greater detail, with specific reference to FIGS. 5, and 8-10.

Helical compression spring 50 is retained radially over a smooth portion of racking screw assembly 44 and axially by racking shield 52 in a non-binding fashion. The helical spring 50 preferably provides generally linear compressive force for smooth operation. In the preferred embodiment, the racking shield completely encircles screw assembly 44. A racking shield tab 54 projects tangentially from racking shield 52 and it engages racking shield retainer 56 within a slot 58 defined by the retainer. The racking shield retainer 56 is connected by bolts 60 to support member 62 along slots which allow reciprocation of the retainer 56 along an axis parallel to the axial centerline of the screw assembly 44. Referring to FIG. 8, compression spring 50 biases racking shield 52 leftwardly in the figure until the tab 54 is restrained by the extreme leftward travel limit of racking shield retainer 56.

The racking shield retainer 56 defines lockout holes 64 which mate in the plan view with holes defined by support member 62. A lock hasp may be inserted through lockout holes 64 through the mating holes in support member 62 to prevent movement of the racking shield 52 and racking shield retainer 56. As will be explained hereafter in connection with operation of the racking mechanism 30, the draw-out unit 24 cannot be translated within the cubicle if the racking shield 52 is locked in its leftwardly most position in FIG. 8. As also shown in this figure, the racking mechanism 30 defines lockout holes 68 which overlie each other in plan form during part of the translation of the racking mechanism. When a lock hasp is inserted in a mating pair of overlying lockout holes 68, the vacuum circuit breaker 24 is held "trip free", which means that separated circuit breaker contacts cannot be closed.

The racking mechanism 30 also has a "trip-free" actuator mechanism 70 which is constructed in known, conventional fashion and which is not part of the present invention.

Figure 5:
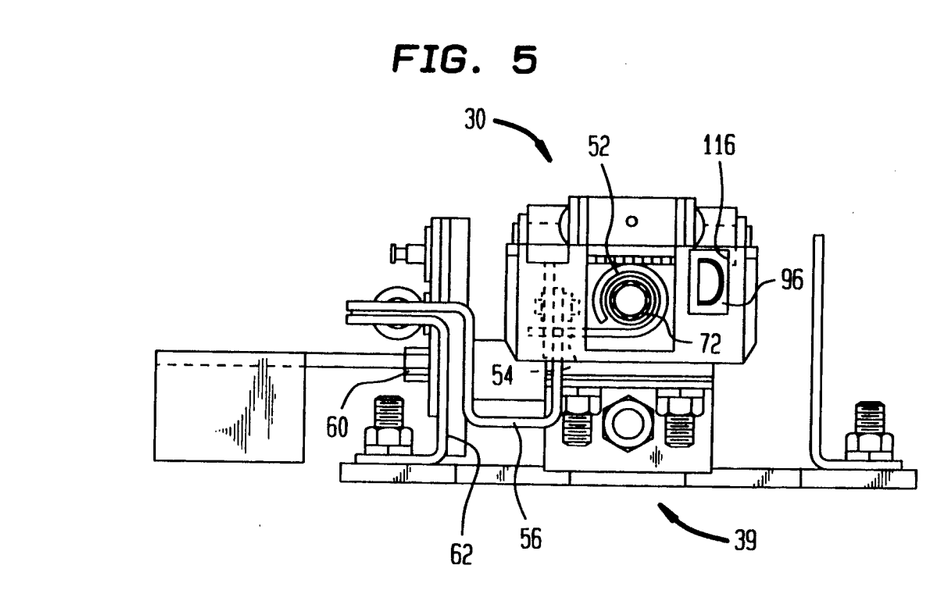
FIG. 5 is a front plan view of the racking mechanism of Fig. 3.
Figure 6:
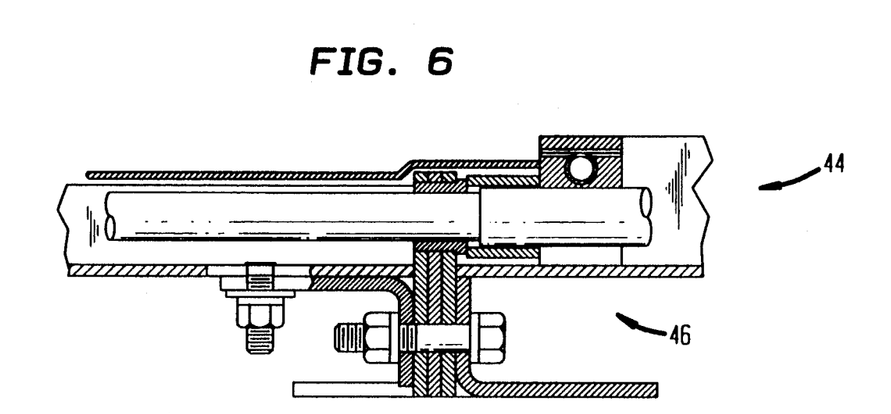
FIG. 6 is a detailed elevational view of the forward sleeved bearing assembly and drive block of FIG. 4.
Figure 7:
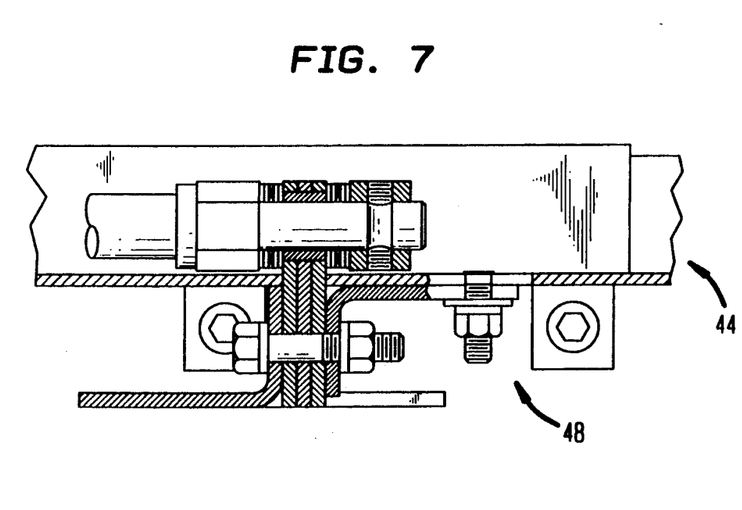
FIG. 7 is a detailed elevational view of the rear sleeved bearing and collar assembly of FIG. 4.

FIGS. 8 and 9 show operation of the racking mechanism 30 by rotation of the racking screw assembly 44. As shown in FIGS. 5 and 8, the racking screw assembly 44 has male socket drive surfaces 72. The embodiment shown has a generally square male socket profile, but any other socket profile may be used, such as hexagonal, star, or post-and-slot profiles. The left end of racking screw assembly 44 in the view of FIG. 8 has a circumferential detent groove 74 around the screw shaft. Crank assembly 76 is utilized to rotate racking screw assembly 44. The crank assembly 76 has a retained crank socket 78 with a square profile female socket portion 80 which corresponds to the male socket surfaces 72 of the racking screw assembly 44. Spring plungers 82 retained within crank socket 78 engage the detent groove 74 formed in screw assembly 44 when the crank is biased in an axially inwardly direction (i.e., to the right in FIG. 8) by an operating technician.

The crank socket 78 is urged against and translates the racking shield 52 to the right in FIG. 8 so that the screw shaft socket drive surfaces 72 engage the female socket portion 80. In prior racking screw mechanism designs, the technician operating crank 76 would have to exert continuous tension against the counter force of the racking shield spring. In the present invention with the new racking mechanism, spring plunger 82 force is selected to be sufficient to retain the plungers in the racking screw assembly detent groove 74 against the counter-biasing force exerted by the helical compression spring 50. Once the operating technician initially exerts sufficient inwardly-directed axial pressure to engage spring plungers 82 within screw shaft detent groove 74, the crank alone maintains the retaining engagement of socket portion 80 and shaft drive surfaces 72. Thereafter, all the operating technician need do is rotate the crank 76.

While the preferred embodiment of the present invention utilizes spring plungers 82 riding in detent grove 72 in order to retain the crank 76 to the screw mechanism 44, it i.s contemplated that other selectively releasable shaft-to-crank retaining mechanisms may be utilized, such as for example a latched plunger, a self-biasing collet bushing or a post and slot-type socket arrangement.

Further construction details of crank 76 are shown in FIG. 10. The crank assembly 76 preferably has an articulated joint 84 interposed between the crank shaft 86 and retained socket 78. Rotating sleeve 88 may be formed from a tightly wound helical spring slipped over the crank shaft 86 prior to its bending into the final shape. Rotatively journaled knob 90 is retained on the crank assembly 76 by a roll pin 92 inserted in mating engagement with a groove 94 formed in the crank shaft 86.

Figure 3:
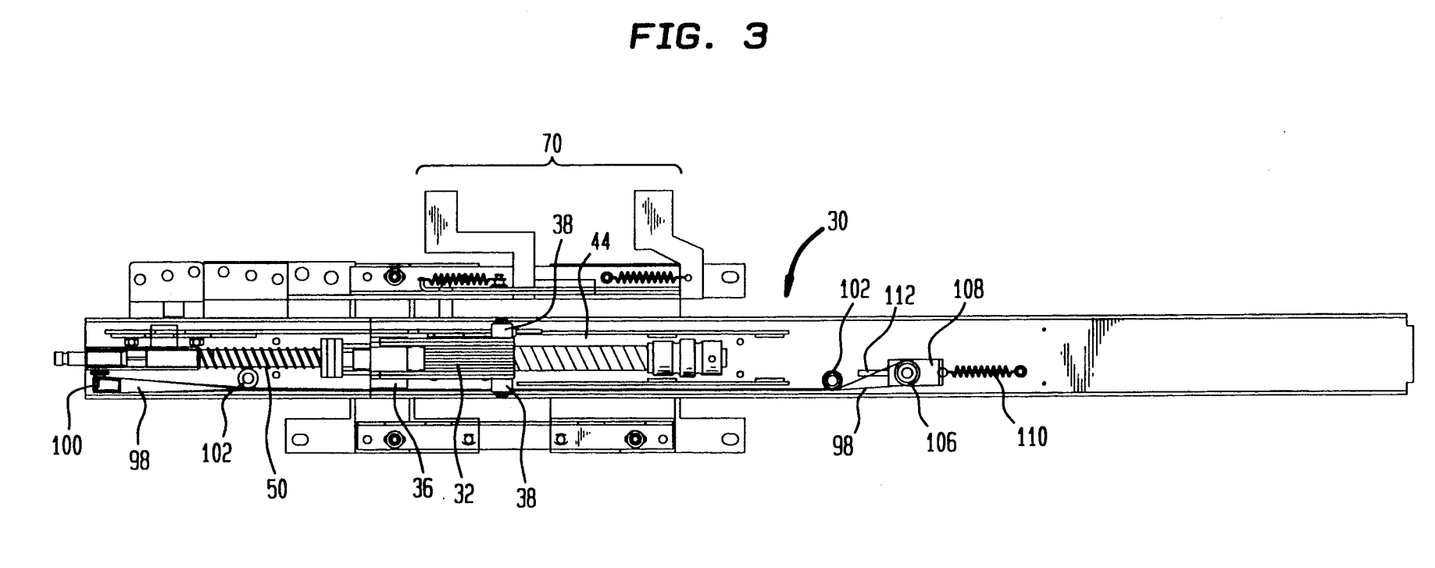
FIG. 3 is a plan view of the racking mechanism of the present invention before installation within a switchgear cubicle.
Figure 4:
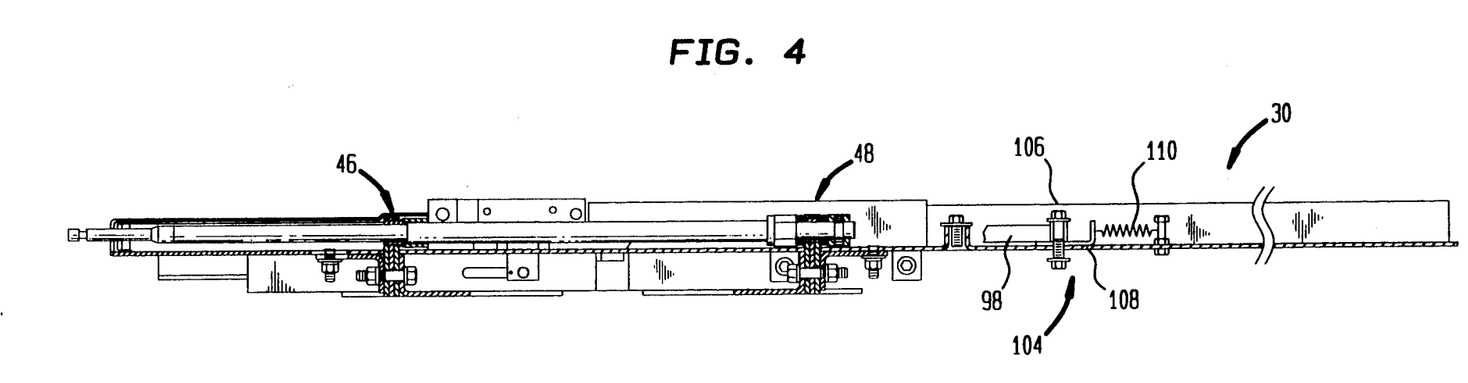
FIG. 4 is a side elevational view of the racking mechanism of FIG. 3.

Now, draw-out unit position indicator features of the racking mechanism of the present invention will be explained in greater detail with reference to FIGS. 3, 8 and 11-13. Tape indicator assembly 96 has a continuous loop tape 98 and a horizontally oriented roller 100 proximal the forward-most face of the racking mechanism 30 when viewed from the front of the cubicle 20. A pair of tape roller guides 102 orient the tape 98 from front to rear of the racking mechanism 30. Tape tensioner assembly 104 includes a tape tensioner roller 106 that is oriented vertically within the racking mechanism 30 on a translatable tape tensioner carrier 108. Tension spring 110 maintains tape tension by urging tape tensioner carrier 108 to the right as shown in FIG. 3. The tape tensioner carrier 108 is slidably attached to the racking support track 39 by a fastener inserted through slot 112 formed in the support track 39.

Referring to FIGS. 11-13, the racking mechanism 30 has a top cover 114 which defines a window 116 on the front and top face thereof for viewing of the continuous-loop tape 98. The window 116 is visible by an operator in a normal standing position relative to the cubicle 20 front door, whether the door is opened or closed, unlike previously known tape indicators which could only be viewed by an operator near floor level.

Indicator continuous loop tape 98 is calibrated to display in the window 116 character symbols indicative of three draw-out unit 24 positions. FIG. 11 shows the racking unit 30 in the "disconnect" position, signified by the letter "D", which in commercial embodiments is a black letter on a green background, appearing in window 116. FIG. 12 shows the racking unit 30 in the "test" position, signified in commercial embodiments by a black letter "T" on a yellow background. FIG. 13 shows the racking unit 30 in the "connect" position, signified in commercial embodiments by a black letter "C" on a red background.

The racking mechanism 30 of the present invention has a second open door draw-out unit 24 position indicator 118, which may be constructed as a plate affixed to the top cover 114. The Position indicator 118 has a portion labelled "TEST POSITION" 120 and a portion labelled "DISCONNECT POSITION" 122, though it can be appreciated that different labelling terminology or indicia media may be used to communicate the same meaning to an operator. Referring also to FIG. 1, the draw-out unit 24 has an indicator pointer 124 affixed to the front panel thereof. When the draw-out unit is in its "test" position, the pointer 124 is aligned with the "TEST POSITION" portion 120 of position indicator 118. Similarly, the indicator pointer 124 is aligned with the "DISCONNECT POSITION" 122 portion of indicator 11B when the draw-out unit is in its disconnect position.

While the preferred embodiment of the present invention has been described herein, it should be understood that it is in no way intended to limit the scope of this invention as set forth in the claims herein.

What is claimed is:

1. A racking mechanism for switchgear cubicle draw-out units comprising:
   (a) a base:
   (b) a drive screw assembly attached to the base including a screw block translated by rotation of a screw of the drive screw assembly, which screw block is adapted for selective a draw-out unit;
   (c) drive surfaces constructed on the drive screw assembly;
   (d) a biased racking shield which surrounds at least a portion of the drive surfaces in a first position and which is translatable to a second position by exerting counter-biasing force against the racking shield, in order to expose a portion of the drive surfaces;
   (e) a crank assembly having a socket portion engageable with the drive surfaces when the racking shield is translated to its second position, in order to rotate the drive screw; and
   (f) means for retaining the socket portion in engagement with the drive surfaces upon translation of the racking shield to its second position.

2. The switchgear racking mechanism of claim 1, wherein the means for retaining comprises:
   (a) a depression formed in a component of the drive screw assembly; and
   (b) a retaining member translatable into the depression which prevents separation of the crank assembly socket portion from the drive surfaces.

3. The switchgear racking mechanism of claim 2, wherein the retaining member comprises a spring-loaded plunger which translates into the depression upon alignment therewith.

4. The switchgear racking mechanism of claim 3, wherein the depression is a detent groove formed proximal the drive surfaces of the screw assembly and the spring-loaded plunger is oriented within the crank assembly socket portion.

5. The switchgear racking mechanism of claim 1, further comprising a draw-out unit position tape indicator oriented on the racking mechanism so that it is readable during rotation of the drive screw with the crank assembly.

6. A switchgear unit comprising:
   (a) a switchgear cubicle;
   (b) a draw-out unit reciprocable within the cubicle;
   (c) a base attached to the cubicle:
   (d) a drive screw assembly attached to the base including a screw block translated by rotation of a screw of the drive screw assembly, which screw block is adapted for selective coupling to a draw-out unit;
   (e) drive surfaces constructed on the drive screw assembly;
   (f) a biased racking shield which surrounds at least a portion of the drive surfaces in a first position and which is translatable to a second position by exerting counter-biasing force against the racking shield, in order to expose a portion of the drive surfaces;
   (g) a crank assembly having a socket portion engageable with the drive surfaces when the racking shield is translated to its second position, in order to rotate the drive screw; and
   (h) means for retaining the socket portion in engagement with the drive surfaces upon translation of the racking shield to its second position.

7. The switchgear unit of claim 6, wherein the means for retaining comprises:
   (a) a depression formed in a component of the drive screw assembly; and
   (b) a retaining member translatable into the depression which prevents separation of the crank assembly socket portion from the drive surfaces.

8. The switchgear unit of claim 7, wherein the retaining member comprises a spring-loaded plunger which translates into the depression upon alignment therewith.

9. The switchgear unit of claim 8, wherein the depression is a detent groove formed proximal the drive surfaces of the screw assembly and the spring-loaded plunger is oriented within the crank assembly socket portion.

10. The switchgear unit of claim 6, further comprising a draw-out unit position tape indicator oriented on the racking mechanism so that it is readable during rotation of the drive screw with the crank assembly.

11. The switchgear unit of claim 10 further comprising:
    (a) an open cubicle door draw-out unit position indicator visible when a door of the cubicle is open having a display portion thereof corresponding to at least one translated position of the draw-out unit; and
    (b) a pointer mounted on the draw-out unit which is proximal the display portion when the draw-out unit is translated to the corresponding position.

12. A switchgear unit comprising:
    (a) a switchgear cubicle;
    (b) a draw-out unit reciprocable within the cubicle;
    (c) a base attached to the cubicle:
    (d) drive screw assembly attached to the base including a screw block translated by rotation of a screw of the drive screw assembly, which screw block is adapted for selective coupling to a draw-out unit;
    (e) drive surfaces constructed on the drive screw assembly;
    (f) a depression formed in a component of the drive screw assembly;
    (g) a biased racking shield which surrounds at least a portion of the drive surfaces in a first position and which is translatable to a second position by exerting counter-biasing force against the racking shield, in order to expose a portion of the drive surfaces;
    (h) a crank assembly having a socket portion engageable with the drive surfaces when the racking shield is translated to its second position, in order to rotate the drive screw; and (i) a retaining member translatable into the depression upon translation of the racking shield to its second position, which retaining member prevents separation of the crank assembly socket portion from the drive surfaces.

13. The switchgear unit of claim 12, wherein the retaining member comprises a spring-loaded plunger which translates into the depression upon alignment therewith.

14. The switchgear unit of claim 13, wherein the depression is a detent groove formed proximal the drive surfaces of the screw assembly and the spring-loaded plunger is oriented within the crank assembly socket portion.

15. The switchgear unit of claim 12, further comprising a draw-out unit position tape indicator oriented on the racking mechanism so that it is readable during rotation of the drive screw with the crank assembly.

16. The switchgear unit of claim 15 further comprising:
  (a) an open cubicle door draw-out unit position indicator visible when a door of the cubicle is open having a display portion thereof corresponding to at least one translated position of the draw-out unit; and
  (b) a pointer mounted on the draw-out unit which is proximal the display portion when the draw-out unit is translated to the corresponding position.

* * * * *